Oct. 19, 1965  N. W. KIRSCHKE  3,213,266
ELECTRIC HEATING UNIT FOR SPILL-PROOF COOKING SURFACE
Filed Dec. 13, 1962
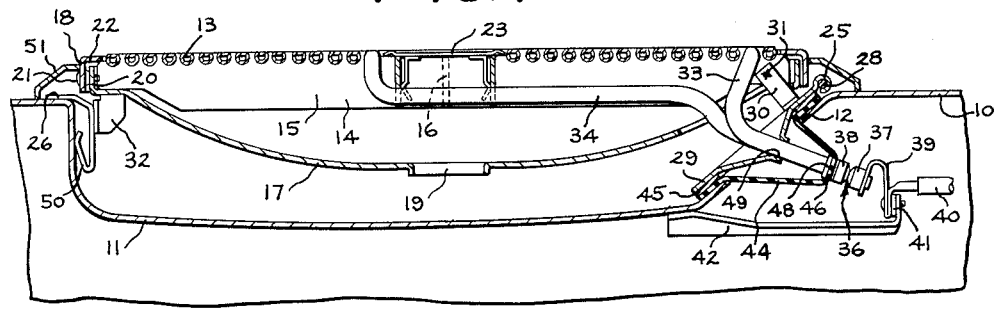
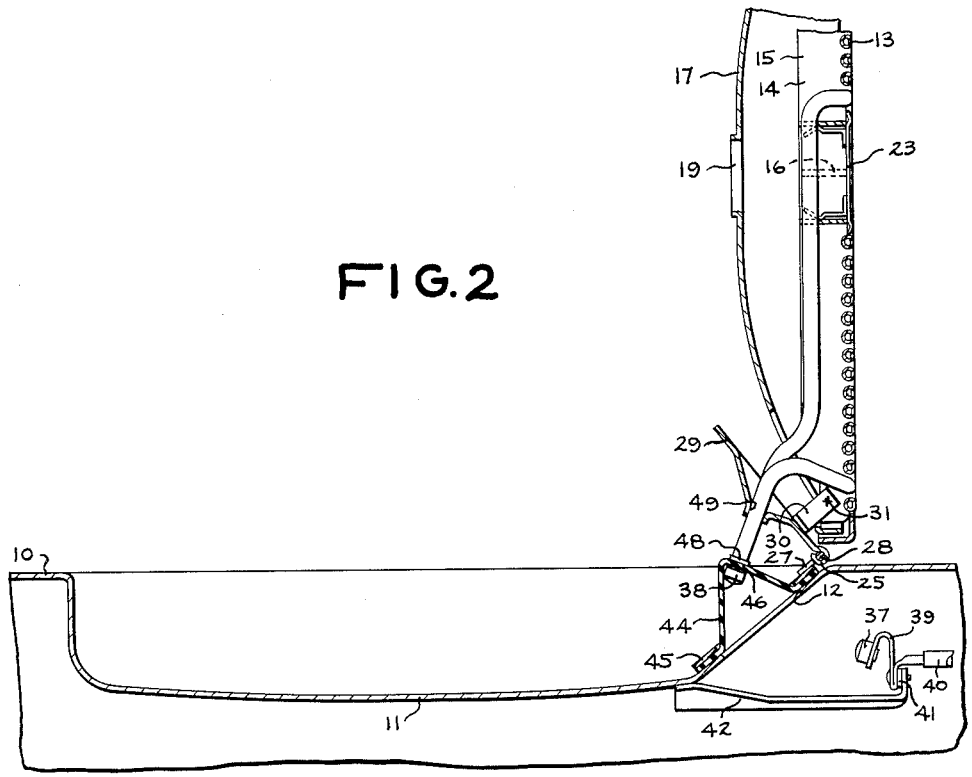
INVENTOR.
NORMAN W. KIRSCHKE
BY Richard L. Caslin
HIS ATTORNEY

United States Patent Office 3,213,266
Patented Oct. 19, 1965

3,213,266
ELECTRIC HEATING UNIT FOR SPILL-PROOF COOKING SURFACE
Norman W. Kirschke, Louisville, Ky., assignor to General Electric Company, a corporation of New York
Filed Dec. 13, 1962, Ser. No. 244,437
3 Claims. (Cl. 219—451)

The present invention relates to an electric heating unit having a resistance heating element that is supported on a top cooking surface over a recess in the cooking surface, and particularly to a novel sealing means for the terminals of the resistance heating element where the terminals extend through a lateral opening in the recess and the sealing means prevents spillage of liquid through the opening.

A standard electric range is provided with a top cooking surface having a plurality of large holes therethrough, each hole having positioned therein a drawn annular reflector pan that also has a large central opening. A resistance heating element is mounted across the top surface of the pan. A hinge means is also provided for each heating element so the element may be pivoted to a raised position and the reflector pan removed whereby a metal drip box located beneath the cooking surface may be maintained clean by being scrubbed periodically. One advantage of the large holes in the cooking surface for receiving the heating element is that only a small amount of heat is lost by heat transfer from the heating element to the cooking surface. One main disadvantage in having such holes is that food and especially liquids are liable to spill onto the reflector pan and drain out the bottom thereof into the metal drip box supported under the heating elements. It is a laborious task to keep this drip box clean since it is difficult to reach all areas of the drip box through the openings, and the visibility within the box is poor.

The principal object of the present invention is to provide an electric heating unit of the mechanically hinged type for use with a spill-proof cooking surface where the terminals of a resistance heating element are provided with a liquid-tight resilient sealing means of such flexibility that will permit the heating element to be pivoted between a horizontal and a vertical position while maintaining the spill-proof feature.

The present invention, in accordance with one form thereof, relates to an electric heating unit in combination with a horizontal cooking surface having a recess over which a resistance heating element is supported. The recess is imperforate except for a lateral opening in a side wall thereof for receiving the terminals of the heating element therethrough. A hinge means is provided for the heating element so that the element may be pivoted from a horizontal to a vertical position for ease in cleaning the recess. A sealing gasket is provided for the lateral opening and is sealed around the terminals so that the opening is liquid-tight in all pivoted positions of the heating element.

My invention will be better understood from the following description taken in conjunction with the accompanying drawing and its scope will be pointed out in the appended claims.

FIGURE 1 is a cross-sectional elevational view taken through the center of a heating unit embodying the present invention and showing the unit in its normal horizontal position.

FIGURE 2 is a cross-sectional elevational view similar to that of FIGURE 1 with the heating unit pivoted to its substantially vertical position.

Turning to a consideration of the drawing and in particular to FIGURE 1, there is shown a horizontal cooking surface 10 having a circular recess or concavity 11 in its top surface which is substantially imperforate except for a lateral opening 12 in one side of the recess for receiving the terminals of a heating element therethrough. Supported across the top surface of the recess is a resistance heating element 13 in the form of a metal-sheathed heating element having an inner helical coil that is packed in a suitable thermal insulating material such as magnesium oxide, and the assembly is covered with a thin metal sheath as is standard in the art. This metal sheathed element is wound in a flat circular coil and it is supported on a spider or framework 14 formed by intersecting metal strips 15 and 16 which underlie the coil. The top edge of each metal strip 15 and 16 is provided with a plurality of shallow slots which receive the turns of the metal sheathed element therein. The sheath unit is lightly crimped in place within the slots so as to prevent displacement of the unit from the slots. A sealing plate or escutcheon 23 is fastened in the center of the coil in order to improve the appearance.

Fastened beneath the heating element 13 is a reflector pan 17 that is held in place by a support ring 18. The reflector pan 17 has a central opening 19 so that food and liquids that might pass through the coils of the element will not accumulate in the reflector pan, but will drain into the recess 11 thereby being mostly shielded from the high temperature that exists at the surface of the heating element 13. The periphery of the reflector pan 17 is provided with an upward flange 20 that is telescoped into the support ring 18 and fastened thereto by a plurality of screw fasteners 21. The upper edge 22 of the support ring 18 has an inner ledge which overlies the top edge of the ends of the metal strips 15 and 16 forming the spider so that there is a sub-assembly created by the heating element 13, metal strips 15 and 16 of the spider 14, reflector pan 17 and support ring 18. The heating unit is supported over the recess 11 by a hinge means 25 at one side of the unit and a support tab or clip member 26 at the opposite side thereof. The hinge means 25 comprises a hinge strap 27 fixed to the cooktop 10 and supporting a pivot pin 28 about which a movable hinge strap 29 is pivoted. Extending from the movable hinge strap 29 is a bracket member 30 which connects this hinge strap to the supporting spider 14 as by a welded connection 31.

The support tab 26 is actually a spring member that is supported beneath the edge of the reflector pan 17 by means of bracket 32. The bottom portion of the tab 26 includes a hairpin spring portion 50 that bears against the side wall of the cooktop recess 11 for centering the heating unit therein. Lastly, the heating unit includes a removable trim ring 51 that slips over the heating element sub-assembly and provides a finished appearance for the heating unit by closing the gap between the periphery of the heating element and the peripheral edge of the recess 11.

The sheathed heating element 13 is formed with two or more electrical terminals 33 and 34 which are to be connected in a power-supplying circuit. The lateral opening 12 mentioned previously is provided so that the terminals 33 and 34 may be brought out through the opening and an electrical connection may be made beneath the cooktop 10 in a protected area for safety. There is shown a quick make and break double pole single throw switch member 36 comprising a double pair of switch contacts 37 and 38 for making an electrical connection when the heating element is in its horizontal position of FIGURE 1, and for breaking the electrical connection when the heating unit is raised from the horizontal position as shown in FIGURE 2. Each switch contact 37 is a generally fixed contact although it is supported on a U-shaped spring member 39. Similarly, each switch contact 38 is formed on the tip of each terminal 33 and 34 of the heating element as is best seen in FIGURE 1. A power lead 40 is joined to a terminal 41 of each of the two fixed contacts 37. It should be understood that the fixed contacts 37 are shown as being supported from the underside of the cooktop 10 by means of bracket member 42 that is welded or otherwise fastened in place to obtain proper positioning of the contact means.

It is imperative that some means be provided for sealing around the terminals 33 and 34 in the vicinity of the lateral opening 12 so that foods or liquids that fall or pour through the sheath unit 13 do not drain out the opening and damage or contaminate the thermal insulation located beneath the cooktop 10 for insulating the oven (not shown) that is usually provided in an electric range beneath the cooktop. This sealing action is provided by a sealing gasket, boot or diaphragm 44 of elastomeric material such as silicone rubber. This gasket 44 is fastened at its edges to the periphery of the lateral opening 12 by means of a metal ring member 45 as best seen in FIGURE 2. Fastening means such as sheet metal screws (not shown) would be provided for the ring member 45 for sandwiching the gasket material between the ring member and the peripheral portion of the lateral opening 12. The gasket is generally of tubular shape where one end is provided with suitable apertures 46 each for receiving a terminal 33 or 34 therethrough. The metal sheath terminates short of the contact member 38 and it will be understood that as in standard metal sheathed heating element designs the terminal ends of the unit are provided with terminal pins, commonly referred to as "cold terminals." In the instant design the tip of the cold terminal is threaded and the contact member 38 has a tapped opening which is screwed onto the threaded cold terminal. A washer member 48 cooperates with the contact member 38 to sandwich the gasket member therebetween in the vicinity of the periphery of the opening 46 in the gasket.

Looking at FIGURE 1, one purpose of the movable hinge strap 29 is to serve as a protective shield across the front of the gasket when the heating element is in its horizontal position so that food and liquids will not accumulate within the pocket of the gasket itself. The central portion of the hinge strap 29 is provided with apertures 49 for receiving the terminals 33 and 34 therethrough. The edges of these apertures 29 are crimped onto the metal sheath of the terminals for both a mechanical fastening means as well as to seal the terminals from leakage of liquids therethrough. By comparing the horizontal position of the heating element in FIGURE 1 with the vertical position of the heating element in FIGURE 2, the movement of the gasket 44 between its two extremes can be visualized.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. An electric heating unit comprising in combination a horizontal cooking surface having a recess therein, a heating element supported over the recess, there being a lateral opening within the recess for receiving the terminals of the heating element therethrough, laterally extending terminal portions on said heating element extending through the lateral opening and providing for electrical connection to said heating element, hinge means having a fixed strap supported on the cooking surface above the lateral opening and a movable strap fastened to the heating unit as well as being sealed around the heating element terminals within the lateral opening and covering said opening in the horizontal position of the unit so that the element may be pivoted from a horizontal to a generally vertical position for ease in cleaning the recess, a boot member of elastomeric material sealed over the lateral opening and containing apertures for receiving the terminal ends of the heating element therethrough, and means for sealing the edges of the apertures in the boot to the terminals of the heating element so as to provide a liquid-tight sealing means around the terminals of the heating element in all positions of the heating element.

2. An electric surface heating unit comprising in combination a horizontal cooking surface having a dished recess therein, a heating element supported over the recess, there being a side opening within the recess for receiving the terminals of the heating element therethrough, at least two terminal portions on said heating element extending through the side opening and providing for electrical connection to said heating element, hinge means having a fixed strap supported on the cooking surface directly above the side opening and a movable strap fastened to the heating unit as well as being sealed around the heating element terminals within the side opening and covering said opening in the horizontal position of the unit so that the element may be pivoted from a horizontal to a generally vertical position for ease in cleaning the dished recess, a sealing gasket of elastomeric sheet material sealed to the peripheral edges of the side opening and containing apertures for receiving the terminal ends of the heating element therethrough, and means for sealing the peripheral edges of the apertures of the gasket to the terminals of the heating element so as to provide a fluid-tight seal around the terminals of the heating element in all positions of the heating element from a horizontal working position to a vertical cleaning position.

3. An electric surface heating unit as recited in claim 2 wherein the sealing gasket is provided with a tubular portion that extends outwardly of the side opening when the heating element is in its horizontal position, said tubular portion being turned inside out when the heating element is raised to its substantially vertical position in order to accommodate the extent of the swinging motion of the terminals of the heating element.

References Cited by the Examiner

UNITED STATES PATENTS 3,091,682   5/63   Prather _____ 219—37.02

FOREIGN PATENTS 1,236,100   6/60   France.

OTHER REFERENCES

Heinbuich: German application 1,029,499, printed May 8, 1958 (Kl 21h 4/01).

RICHARD M. WOOD, *Primary Examiner.*